US009825477B2

(12) United States Patent
Miura et al.

(10) Patent No.: US 9,825,477 B2
(45) Date of Patent: Nov. 21, 2017

(54) ASSEMBLED BATTERY MONITORING DEVICE

(71) Applicant: Hitachi Automotive Systems, Ltd., Hitachinaka-shi, Ibaraki (JP)

(72) Inventors: Hikaru Miura, Hitachinaka (JP); Akihiko Kudo, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 194 days.

(21) Appl. No.: 14/436,775

(22) PCT Filed: Oct. 19, 2012

(86) PCT No.: PCT/JP2012/077122
§ 371 (c)(1),
(2) Date: Apr. 17, 2015

(87) PCT Pub. No.: WO2014/061153
PCT Pub. Date: Apr. 24, 2014

(65) Prior Publication Data
US 2015/0303728 A1    Oct. 22, 2015

(51) Int. Cl.
*H02J 7/00* (2006.01)
*H01M 10/48* (2006.01)
*H01M 10/42* (2006.01)

(52) U.S. Cl.
CPC ......... *H02J 7/0057* (2013.01); *H01M 10/425* (2013.01); *H01M 10/48* (2013.01); *H02J 7/0016* (2013.01); *H01M 10/482* (2013.01); *H01M 2010/4271* (2013.01); *Y02T 10/7055* (2013.01)

(58) Field of Classification Search
USPC ........................................................ 320/119
See application file for complete search history.

(56) References Cited

U.S. PATENT DOCUMENTS

| 2007/0120529 | A1 | 5/2007 | Ishikawa et al. | |
| 2011/0127963 | A1 | 6/2011 | Murao et al. | |
| 2011/0193413 | A1* | 8/2011 | Kudo | H02J 7/0018 307/77 |
| 2012/0299545 | A1* | 11/2012 | Kuraishi | H02J 7/0055 320/112 |

FOREIGN PATENT DOCUMENTS

| JP | 2003-282159 A | 10/2003 |
| JP | 2004-266937 A1 | 9/2004 |

(Continued)

*Primary Examiner* — Robert Grant
(74) *Attorney, Agent, or Firm* — Volpe and Koenig, P.C.

(57) ABSTRACT

A battery monitoring device monitors a battery having a plurality of cell groups in which a plurality of cells is connected in series. The battery monitoring device comprises at one or more integrated circuit units, each of which corresponds to each cell group, that respectively measure the voltages of the cells of the cell group and performs cell balancing in order to adjust the capacities of the cells of the cell group; a control unit that controls the integrated circuit unit; and a power supply unit that supplies power to the control unit. The control unit causes the integrated circuit unit to start or to stop cell balancing, and sets a timer period for starting or stopping supply of the power.

7 Claims, 6 Drawing Sheets

(56) References Cited

FOREIGN PATENT DOCUMENTS

| JP | 2007-151256 A1 | 6/2007 |
| JP | 2007-325458 A | 12/2007 |
| JP | 2011-76947 A | 4/2011 |
| JP | 2011-115016 A | 6/2011 |
| JP | 2011-166867 A | 8/2011 |

* cited by examiner

ASSEMBLED BATTERY MONITORING DEVICE

TECHNICAL FIELD

The present invention relates to a device that monitors an assembled battery comprising a plurality of cells.

BACKGROUND ART

In the past, for a device that monitors an assembled battery comprising a plurality of cells, a cell balancing technique has been per se known in which variation of the remaining charge capacities of the various cells has been eliminated by calculating the remaining charge capacity of each cell, and by controlling balancing switches that are provided to correspond to the various cells on the basis of the results of that calculation. A technique for reducing the consumption of electrical power during this type of cell balancing is disclosed in PTL 1.

With the battery control system disclosed in PTL 1, along with providing a CMOS timer IC to correspond to each cell in the interior of a battery control unit that is connected to the assembled battery, also a timer is provided within a system control unit that is employed for performing communication with the battery control unit. By using these timers, it is arranged to operate only the minimum limit number of capacity adjustment circuits within the battery control unit that are actually required during cell balancing, so that thereby the consumption of electrical power is reduced.

CITATION LIST

Patent Literature

PTL 1: Japanese Laid-Open Patent Publication 2003-282159.

SUMMARY OF INVENTION

Technical Problem

With the technique for a battery control system disclosed in PTL 1, it is necessary to provide an individual CMOS timer IC within the battery control unit for each of the cells, and this entails an increase in the cost of the battery control unit. Accordingly, it is not possible to attain reduction of the amount of power consumed during cell balancing at a low cost. Furthermore, after the operation of the capacity adjustment circuit has been started, the operation of the other circuitry within the battery control unit and the operation of the system control unit are suspended. Due to this, it is not possible to check upon the completion of cell balancing.

Solution to Technical Problem

An assembled battery monitoring device according to an aspect of the present invention that monitors an assembled battery having one or a plurality of cell groups in which a plurality of cells are connected in series, comprises: one or more integrated circuit units, each of which is provided to correspond to each of the one or more cell groups of the assembled battery, that respectively measure the voltages of the cells of the corresponding cell group and perform cell balancing in order respectively to adjust the capacities of the cells of the corresponding cell group; a control unit that controls the integrated circuit unit by performing communication with the integrated circuit unit; and a power supply unit that supplies power to the control unit. According to supply of the power from the power supply unit, the control unit causes the integrated circuit unit to start or to stop the cell balancing, and sets a timer period for starting of the power supply unit to cause the power supply unit to stop supply of the power; and, according to the timer period, the power supply unit activates and commences supply of the power.

Advantageous Effects of Invention

According to the present invention, along with attaining reduction of the electrical power consumption during cell balancing at low cost, also it is possible to check upon the completion of cell balancing.

DESCRIPTION OF EMBODIMENTS

Embodiment #1

Figure 1:
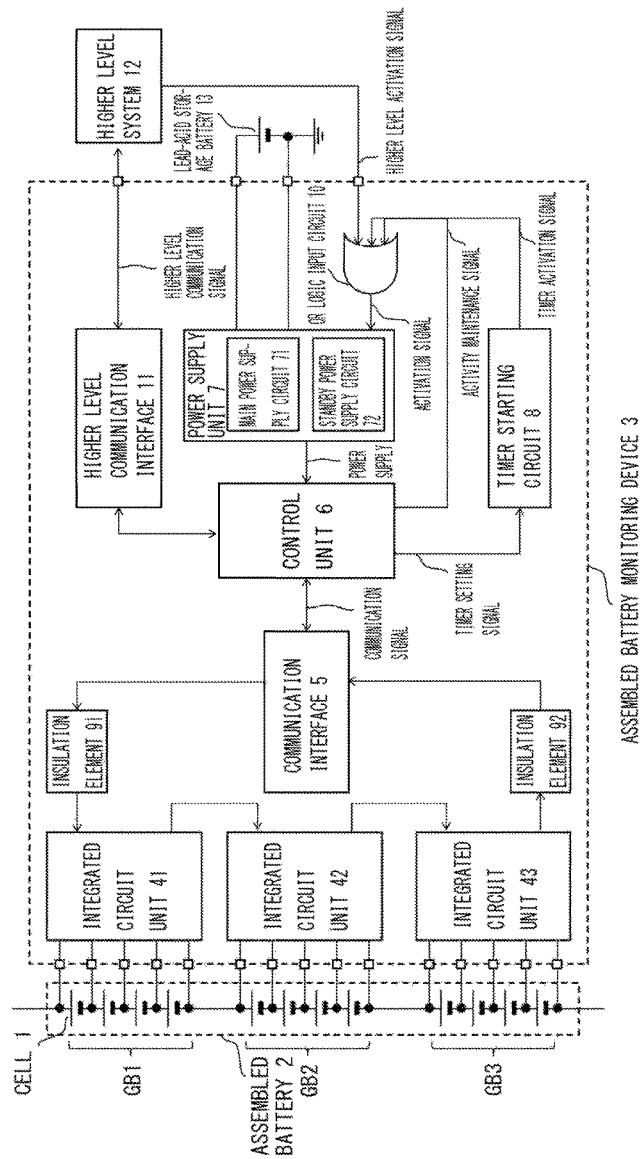
FIG. 1 is a figure showing the structure of an assembled battery monitoring device according to a first embodiment of the present invention.

FIG. 1 is a figure showing the structure of an assembled battery monitoring device according to a first embodiment of the present invention. The assembled battery monitoring device 3 shown in FIG. 1 is a device that monitors an assembled battery 2 comprising cell groups GB1 through GB3, each of those groups comprising a plurality of cells 1 that are connected in series, and is connected to the assembled battery 2, to a higher level system 12, and to a lead-acid storage battery 13. As shown in FIG. 1, this assembled battery monitoring device 3 comprises integrated circuit units 41 through 43, insulation elements 91 and 92, a communication interface 5, a control unit 6, a power supply unit 7, a timer starting circuit 8, an OR logic input circuit 10, and a higher level communication interface 11. It should be understood that this assembled battery monitoring device 3 is employed by being mounted to a system that performs driving of an electric motor by using the electrical power of the assembled battery 2, i.e., for example, is mounted to a vehicle propulsion system in an electric vehicle or in a hybrid electric vehicle.

The integrated circuit units 41 through 43 are provided to correspond to the cell groups GB1 through GB3 respectively, and each one of them is connected to all of the cells 1 of the corresponding cell group. These integrated circuit units 41 through 43 are connected together by daisy chain connection. This daisy chain of the integrated circuit units 41 through 43 is connected to the control unit 6 via the insulation elements 91 and 92 and via the communication interface 5.

The communication interface 5 functions as an interface when communication signals are being inputted and outputted between the control unit 6 and the integrated circuit units 41 through 43. In concrete terms, when a communication signal is outputted from the control unit 6, the communication interface 5 outputs this communication signal via the insulation element 91 to the integrated circuit unit 41, which is the one in the daisy chain connection that has the highest ranking. Moreover, when a communication signal is outputted via the insulation element 92 from the integrated circuit unit 43, which is the one in the daisy chain connection that has the lowest ranking, the communication interface 5 outputs this communication signal to the control unit 6. For example, photocouplers or the like may be used as the insulation elements 91 and 92.

When the integrated circuit unit 41, which is the one in the daisy chain connection having the highest ranking, receives a communication signal from the control unit 6 via the communication interface 5 and the insulation element 91, it transmits this communication signal to the next integrated circuit unit in the order of communication, in other words to the integrated circuit unit 42 which has an intermediate ranking. At this time, if command information for the integrated circuit unit 41 is included in the communication signal that has been received, then the integrated circuit unit 41 performs operation corresponding to the details of this command information. For example, the operations that can be executed by the integrated circuit unit 41 include measurement of the voltages of the cells 1 of the corresponding cell group GB1, and cell balancing in order to adjust the remaining charge capacity of these cells 1.

When the integrated circuit unit 42 receives the communication signal from the integrated circuit unit 41, it transmits this communication signal to the next integrated circuit unit in the order of communication, in other words to the integrated circuit unit 43 which has the lowest ranking. At this time, in a similar manner to the case for the integrated circuit unit 41, if command information for the integrated circuit unit 42 is included in the communication signal that has been received, then the integrated circuit unit 42 performs operation corresponding to the details of this command information.

When the integrated circuit unit 43 receives the communication signal from the integrated circuit unit 42, it transmits this communication signal back to the control unit 6 via the insulation element 92 and the communication interface 5. At this time, in a similar manner to the case for the integrated circuit units 41 and 42, if command information for the integrated circuit unit 43 is included in the communication signal that has been received, then the integrated circuit unit 43 performs operation corresponding to the details of this command information.

It is possible for the control unit 6 and the integrated circuit units 41 through 43 to perform mutual communication by transmitting and receiving communication signals in the manner described above. It should be understood that information specifying results of measurement of the voltages of the cells 1 and so on performed by the integrated circuit units 41 through 43 can be transmitted from the integrated circuit units 41 through 43 to the control unit 6 along with the communication signal described above, or by employing a similar communication procedure to that used for communication signals.

The control unit 6 is a section for performing predetermined control procedures and calculation processing, and may, for example, be implemented using a microcomputer or the like. By communication being performed between the control unit 6 and the integrated circuit units 41 through 43 as described above according to processing executed by this control unit 6, it is possible for the operation of the integrated circuit units 41 through 43 to be controlled from the control unit 6. Moreover, it is also possible to cause a timer setting signal to be outputted from the control unit 6 to the timer starting circuit 8, or to cause an activity maintenance signal to be outputted to the power supply unit 7 via the OR logic input circuit 10. The control unit 6 is connected to the power supply unit 7, and operates by receiving power supplied from the power supply unit 7.

The power supply unit 7 comprises a main power supply circuit 71 for supplying power to the control unit 6 and so on when this assembled battery monitoring device 3 is operating in a normal mode, and a standby power supply circuit 72 for supplying standby power to the timer starting circuit 8 and so on when the assembled battery monitoring device 3 is operating in a low power consumption mode. This power supply unit 7 is connected to the output side of the OR logic input circuit 10, and, according to an activation signal that is outputted from the OR logic input circuit 10, is changed over either to an active state or to a standby state. When this activation signal is being outputted, the power supply unit 7 is put into its active state, and performs supply of power from the main power supply circuit 71 to the control unit 6 and so on by employing the electrical power of the lead-acid storage battery 13. Due to this, the assembled battery monitoring device 3 operates in its normal mode. On the other hand, when the activation signal is not being outputted, the power supply unit 7 is put into its standby state, and suspends the supply of power from the main power supply circuit 71, while only providing a supply of standby power from the standby power supply circuit 72 to the timer starting circuit 8 and so on. Due to this, the assembled battery monitoring device 3 operates in its low power consumption mode. Thus, it should be understood that the provision of a supply of standby power from the standby power supply circuit 72 is performed both in the normal mode and in the low power consumption mode.

The timer starting circuit 8 is a circuit for causing the power supply unit 7 to start at a predetermined timing. When a timer period that has been set in advance has elapsed from when the assembled battery monitoring device 3 has started operation in the low power consumption mode, this timer starting circuit 8 outputs a timer activation signal to the OR logic input circuit 10. Due to this, the activation signal is outputted from the OR logic input circuit 10 to the power supply unit 7 so that the power supply unit 7 is started, and the operational mode of the assembled battery monitoring device 3 transitions from the low power consumption mode to the normal mode. The setting of the timer period for the timer starting circuit 8 is performed by a timer setting signal that is outputted from the control unit 6 during operation in the normal mode.

It should be understood that two types of timer period can be set to the timer starting circuit 8 by the control unit 6. One of these is a timer period that is set in order periodically to perform cell balancing for the cells 1 of the assembled battery 2. By the power supply unit 7 being periodically activated according to this timer period, this assembled battery monitoring device 3 periodically performs cell balancing, so that, during operation in the low power consumption mode, it is possible to prevent undue variation of the remaining charge capacities of the cells 1 of the assembled battery 2. In the following explanation, this timer period will be termed the "timer period T1".

The other type of timer period is a timer period that is set in order to decide whether or not cell balancing for the cells 1 of the assembled battery 2 has been completed. As will be explained hereinafter, when cell balancing is started by this assembled battery monitoring device 3, a timer period corresponding to the period of time required for this cell balancing is set to the timer starting circuit 8, and the system changes over to the low power consumption mode. By the power supply unit 7 being activated according to this timer period, the assembled battery monitoring device 3 is able to decide whether or not cell balancing has been completed. In the following explanation, this timer period will be termed the "timer period T2".

When the OR logic input circuit 10 inputs at least one of the activity maintenance signal from the control unit 6, the timer activation signal from the timer starting circuit 8, and a higher level activation signal from the higher level system 12, it outputs the activation signal to the power supply unit 7. In other words, due to the OR output, any one of these input signals is treated as an activation signal that is outputted from the OR logic input circuit 10 to the power supply unit 7.

The higher level communication interface 11 is a section that functions as an interface when higher level communication signals are inputted and outputted between the control unit 6 and the higher level system 12. In other words, the control unit 6 is capable of transmitting and receiving higher level communication signals to and from the higher level system 12 via this higher level communication interface 11. Due to this, the assembled battery monitoring device 3 can be controlled from the higher level system 12, and the results of monitoring of the assembled battery 2 by the assembled battery monitoring device 3 can be reported to the higher level system 12. The higher level system 12 is a system of a vehicle such as, for example, an electric vehicle or a hybrid electric vehicle or the like, and a vehicle control device or the like is included therein.

According to requirements, the higher level system 12 is capable of outputting the higher level activation signal to the assembled battery monitoring device 3. In the assembled battery monitoring device 3, as previously described, this higher level activation signal is inputted to the OR logic input circuit 10, and is outputted as the activation signal from the OR logic input circuit 10 to the power supply unit 7. Due to this, the higher level system 12 is capable of causing the power supply unit 7 to become activated at any desired timing, and thereby is capable of causing the assembled battery monitoring device 3 to start operation in its normal mode. For example, a key switch signal of the vehicle may be employed as this higher level activation signal.

Figure 2:
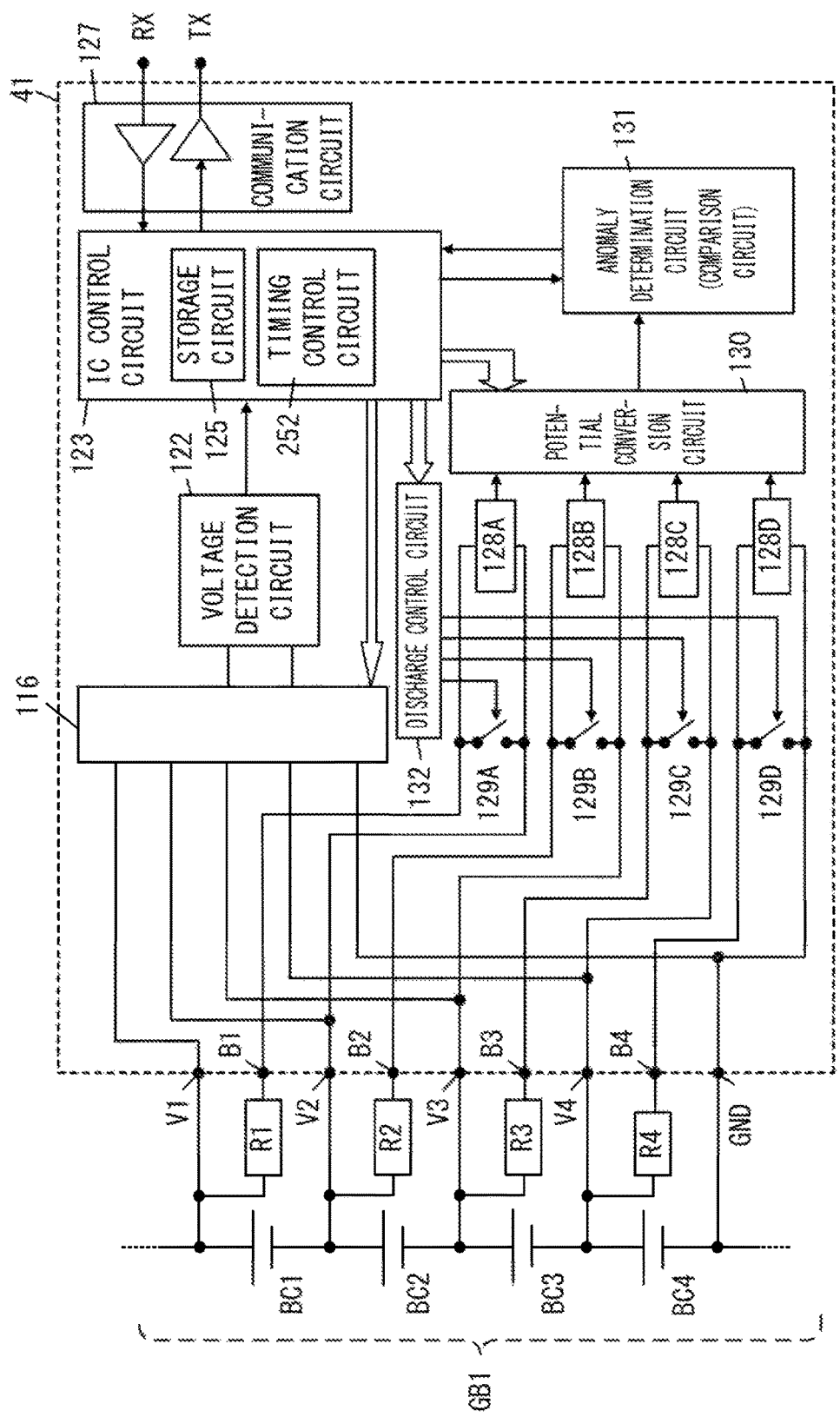
FIG. 2 is a figure showing the internal structure of an integrated circuit unit.

Next, the integrated circuit units 41 through 43 will be explained in detail. FIG. 2 is a figure showing the internal structure of the integrated circuit unit 41. It should be understood that the other integrated circuit units 42 and 43 have similar internal structures, although explanation thereof will be omitted.

As shown in FIG. 1, four cells 1 are included in the cell group GB1 that corresponds to the integrated circuit unit 41. In FIG. 2, these cells 1 are shown as cells BC1 through BC4. The positive terminal of the cell BC1 is connected via an input terminal V1 to an input circuit 116 within the integrated circuit unit 41. This input circuit 116 includes a multiplexer. In a similar manner the positive terminal of the cell BC2, which is the negative terminal of the cell BC1, is connected to the input circuit 116 via an input terminal V2; the positive terminal of the cell BC3, which is the negative terminal of the cell BC2, is connected via an input terminal V3 to the input circuit 116; and the positive terminal of the cell BC4, which is the negative terminal of the cell BC3, is connected via an input terminal V4 to the input circuit 116. Moreover, the negative terminal of the cell BC4 is connected to a terminal GND of the integrated circuit unit 41.

The voltage detection circuit 122 includes a circuit that converts the voltages between the terminals of each of the cells BC1 through BC4 to digital values. These voltages between the cell terminals that have been converted to digital values are sent to an IC control circuit 123, and are stored in an internal storage circuit 125. These voltages are employed for self-diagnosis or the like, and are transmitted to the control unit 6 of FIG. 1.

The IC control circuit 123, along with having a calculation function, also incorporates the storage circuit 125 and a timing control circuit 252 for controlling the timings at which various voltages are detected and the timing at which state diagnosis is performed. The storage circuit 125 may, for example, be built from register circuits. The voltages between the terminals of the various cells BC1 through BC4 that have been detected by the voltage detection circuit 122 are stored in the storage circuit 125 within the IC control circuit 123 in correspondence with the cells BC1 through BC4. Moreover, detected values of various other types may also be stored in the storage circuit 125 in addresses that are determined in advance, so that they can be read out.

A communication circuit 127 is connected to the IC control circuit 123. Along with communication signals transmitted from the control unit 6 to the integrated circuit unit 41 being inputted to the IC control circuit 123 via this communication circuit 127, also communication signals that are outputted from the IC control circuit 123 are transmitted to the next integrated circuit unit 42 via the communication circuit 127. When a communication signal is inputted from the control unit 6, the IC control circuit 123 decodes the contents of the command information included in this communication signal, and performs processing corresponding thereto. This command information from the control unit 6 may, for example, include command information for measuring the voltages of the cells BC1 through BC4, cell balancing start command information for adjusting the states of charge of the cells BC1 through BC4, and so on.

The positive terminal of the cell BC1 is connected to a terminal B1 via a resistor R1. A balancing switch 129A is provided between this terminal B1 and the terminal V2. And an operational state detection circuit 128A is connected in parallel with the balancing switch 129A in order to detect the operational state of this switch 129A. The opening and closing of this balancing switch 129A is controlled by a discharge control circuit 132. In a similar manner, the positive terminal of the cell BC2 is connected to a terminal B2 via a resistor R2, and a balancing switch 129B is provided between this terminal B2 and the terminal V3. And an operational state detection circuit 128B is connected in parallel with the balancing switch 129B in order to detect the operational state of this switch 129B. The opening and closing of this balancing switch 129B is controlled by the discharge control circuit 132.

Furthermore, the positive terminal of the cell BC3 is connected to a terminal B3 via a resistor R3, and a balancing switch 129C is provided between this terminal B3 and the terminal V4. And an operational state detection circuit 128C is connected in parallel with the balancing switch 129C in order to detect the operational state of this switch 129C. The opening and closing of this balancing switch 129C is controlled by the discharge control circuit 132. Yet further, the positive terminal of the cell BC4 is connected to a terminal B4 via a resistor R4, and a balancing switch 129D is provided between this terminal B4 and the terminal GND. And an operational state detection circuit 128D is connected in parallel with the balancing switch 129D in order to detect the operational state of this switch 129D. The opening and closing of this balancing switch 129D is controlled by the discharge control circuit 132.

The operational state detection circuits 128A through 128D repeatedly detect the voltages between the two sides of the corresponding balancing switches 129A through 129D on a predetermined cycle, and detect whether or not the balancing switches 129A through 129D are in their normal states. The balancing switches 129A through 129D are switches for adjusting the states of charge of the cells BC1 through BC4 respectively. If one of these switches experiences an anomaly, then it becomes impossible to control the state of charge of the corresponding cell, and there is a danger that one or more of the cells may become overcharged or over-discharged. For example if, irrespective that one of the balancing switches is in its continuous state, the voltage between its terminals exhibits the terminal voltage of the corresponding cell, then it is detected that this balancing switch is anomalous. In this case, this balancing switch does not go to the continuous state on the basis of its control signal. Moreover if, irrespective that one of the balancing switches is in its open state, the voltage between its terminals is a low value as compared with the terminal voltage of the corresponding cell, then it is detected that this balancing switch is anomalous. In this case, this balancing switch has become continuous, without any relationship to its control signal. For example, voltage detection circuits such as differential amps or the like may be employed as these operational state detection circuits 128A through 128D that perform anomaly detection for the balancing switches 129A through 129D respectively in this manner.

The balancing switches 129A through 129D may, for example, be made with MOS type FETs, and operate to cause discharge of electrical power accumulated in the respectively corresponding cells BC1 through BC4. When an electrical load such as an inverter or the like is connected to an assembled battery 2 in which a large number of cells are connected in series, the supply of current to this load is performed by all of this large number of cells that are connected in series. At this time, if the states of charge (SOC) are mutually different between the various cells, then the current comes to be limited by the state of that cell in the assembled battery 2 that is the most discharged one, which is undesirable. On the other hand, supply of current to the assembled battery 2 in the state in which the assembled battery 2 is charged is performed to all of the large number of cells that are connected in series. At this time, if the states of charge (SOC) are mutually different between the various cells, then the current comes to be limited by the state of the cell in the assembled battery 2 that is the most charged one, which is also undesirable.

Therefore, according to requirements, cell balancing as described below is performed in order to eliminate undesirable limitation of current due to difference such as described above between the states of charge of the various cells. In concrete terms, for those cells, among the large number of cells that are connected in series in the assembled battery 2, whose state of charge is greater than a predetermined state of charge, for example the average value of the states of charge of the cells, the balancing switches that are connected to those cells are put into the continuous state. Due to this, discharge currents flow from those cells via the resistors that are connected in series with their balancing switches that have been put into the continuous state. As a result, the states of charge of those cells come to be controlled in the direction to bring them mutually closer together. Furthermore, as another method, there is also a method of taking that cell in the assembled battery 2 that is in the most discharged state as a reference cell, and determining a discharge interval on the basis of the difference of the states of charge from that of the reference cell. Apart from the above, it would be possible to employ cell balancing methods of various other types for adjusting the states of charge of the cells. It should be understood that it is possible to calculate the states of charge of the cells on the basis of the terminal voltages of the cells. Since there is a correlation relationship between the states of charge of the cells and their terminal voltages, accordingly it is possible to bring the states of charge of the cells mutually closer to one another by controlling the balancing switches 129A through 129D so as to bring the terminal voltages of the cells mutually closer to one another.

The voltages between the terminals of the balancing switches 129A through 129D, in other words the voltages between the sources and the drains of the FETs incorporated in the balancing switches 129A through 129D, are detected by the operational state detection circuits 128A through 128D, and are outputted to a potential conversion circuit 130. Here, since the potentials between the sources and the drains of the FETs are all different from one another with respect to the reference potential, accordingly it is difficult to determine comparison between them just as they are. Thus, these potentials are all standardized by the potential conversion circuit 130, and subsequently anomaly determination is performed by an anomaly determination circuit 131. Moreover, on the basis of a control signal from the IC control circuit 123, the potential conversion circuit 130 also functions to select a balancing switch that is to be diagnosed, among the balancing switches 129A through 129D. When the voltage between the terminals of the balancing switch that has been selected is sent from the potential conversion circuit 130 to the anomaly determination circuit 131, on the basis of a control signal from the IC control circuit 123, the anomaly determination circuit 131 compares the voltage between these terminals with a predetermined determination voltage. By doing this, the anomaly determination circuit 131 is able to make a decision as to whether or not any of the balancing switches 129A through 129D is in an anomalous state.

A command signal for causing the balancing switch corresponding to the cell that is to be discharged to go continuous is sent from the IC control circuit 123 to the discharge control circuit 132. On the basis of this command signal, the discharge control circuit 132 outputs a signal corresponding to the gate voltage of the balancing switch 129A through 129D that is to be caused to go continuous, which incorporates a MOS type FET as described above.

Upon receipt from the control unit 6 of a command for discharge intervals corresponding to the various cells by receiving the communication signal from the control unit 6 of FIG. 1 via the communication circuit 127, the IC control circuit 123 executes cell balancing operation as described above in response to this command. Moreover, if the IC control circuit 123 detects an anomaly of any one of the balancing switches 129A through 129D, then it transmits this detection result to the control unit 6 via the communication circuit 127.

Next, the starting timings of various portions of the assembled battery monitoring device 3 will be explained. As previously described, according to the state of the power supply unit 7, this assembled battery monitoring device 3 performs operation according to either its normal mode or its low power consumption mode. In other words, if the power supply unit 7 is in the active state, the assembled battery monitoring device 3 performs operation in its normal mode, while on the other hand, if the power supply unit 7 is in the standby state, then the assembled battery monitoring device 3 performs operation in its low power consumption mode. When the assembled battery monitoring device 3 is operating in its normal mode, according to requirements, by performing communication with the higher level system 12 and the integrated circuit units 41 through 43, the control unit 6 performs measurement of the voltages of the cells 1 and performs cell balancing. At this time, the timings at which the control unit 6 and the integrated circuit units 41 through 43 are started are different for the case when the power supply unit 7 has been started according to the higher level activation signal from the higher level system 12 (hereinafter this will be termed "normal starting"), and for the case when the power supply unit 7 has been started according to the timer activation signal from the timer starting circuit 8 (hereinafter this will be termed "timer starting"). In the following, this point will be explained in detail.

Figure 3:
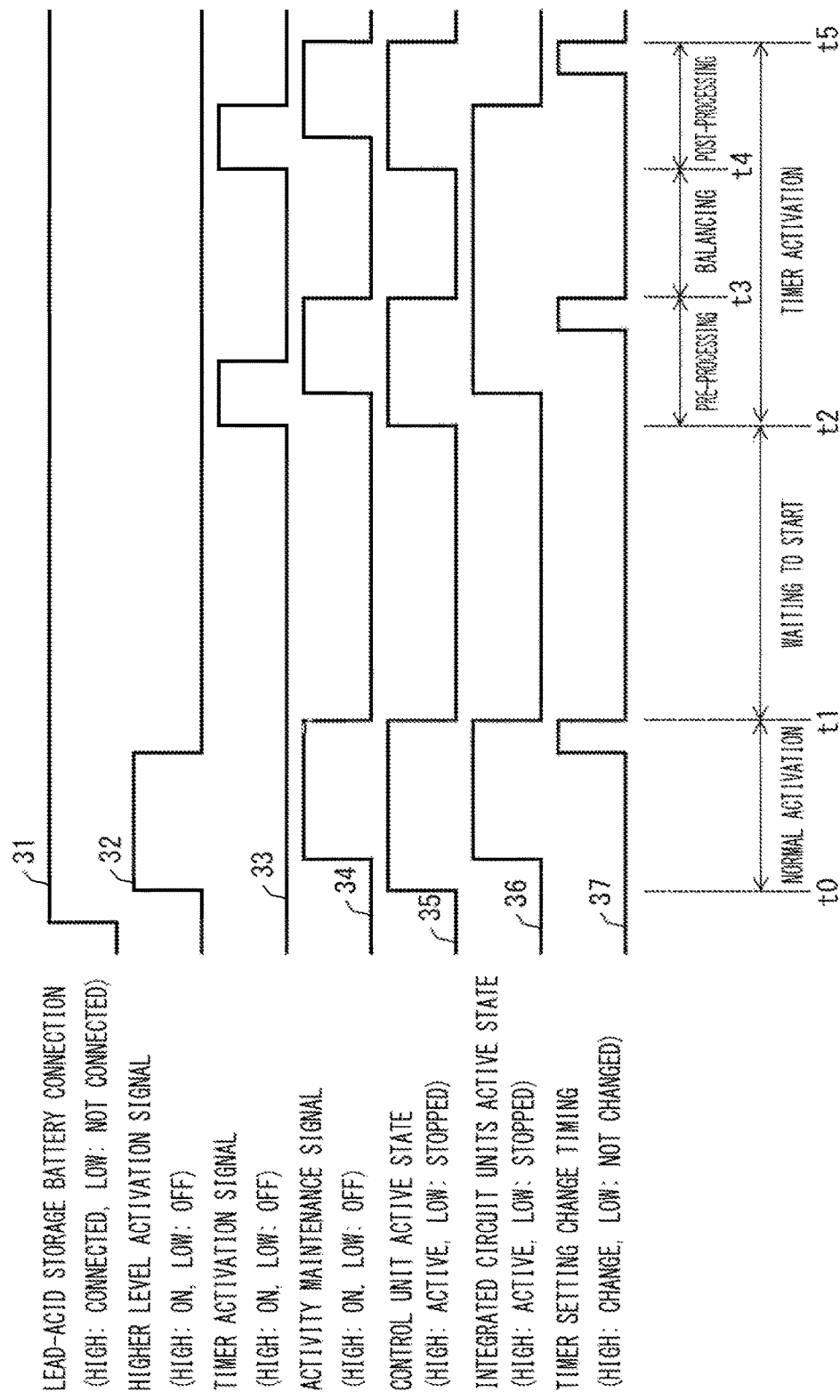
FIG. 3 is a figure showing timing charts for the operations of various portions of this assembled battery monitoring device.

FIG. 3 is a figure showing operational timing charts for various portions of this assembled battery monitoring device 3. In FIG. 3, in the interval between the time points t0 and t1, the operational timings of various events during normal starting are shown, while, in the interval between the time points t2 and t5, the operational timings of various events during timer starting are shown. Moreover, the interval between the above intervals, i.e. the interval between the time points t1 and t2, is an interval in which the assembled battery monitoring device 3 is in the low power consumption mode and is waiting to start operation.

As shown by the line 31 in FIG. 3, when the assembled battery monitoring device 3 is connected to the lead-acid storage battery 31, the power supply unit 7 goes into a state in which it can be activated. Thereafter, when at the time point t0 a higher level activation signal is transmitted from the higher level system 12 as shown by the line 32, correspondingly thereto the power supply unit 7 activates, and supply of power from the main power supply circuit 71 of the power supply unit 7 to the control unit 6 is commenced. As a result, the control unit 6 goes into the active state as shown by the line 35, and operation of the assembled battery monitoring device 3 in the normal mode according to normal starting is started.

Having been activated as described above, the control unit 6 outputs an activity maintenance signal to the OR logic input circuit 10, as shown by the line 34. Due to this, even if the output of the higher level activation signal from the higher level system 12 is terminated, still the output of the activation signal from the OR logic input circuit 10 to the power supply unit 7 is continued, so that it is arranged for the control unit 6 to be able to continue its own operation. Furthermore, the control unit 6 transmits a predetermined communication signal to the integrated circuit units 41 through 43 via the communication interface 5 and the insulation element 91. Upon receipt of this communication signal, as shown by the line 36, the integrated circuit units 41 through 43 go into the active state, and transmission and reception of communication signals is performed between the control unit 6 and the integrated circuit units 41 through 43. Due to this, according to commands from the control unit 6, according to requirements, measurement of the voltages of the cells 1 and cell balancing are performed.

Thereafter when, as shown by the line 32, the output of the higher level activation signal from the higher level system 12 is terminated, the control unit 6 starts processing for ending its activation. At this time, as shown by the line 37, by outputting a timer setting signal to the timer starting circuit 8, the control unit 6 sets the tinier period according to the time interval until the next timing for activation. In other words, among the two types of timer period described above, the timer period T1 is set to the timer starting circuit 8. Moreover, via the communication interface 5 and the insulation element 91, the control unit 6 transmits a communication signal for commanding the integrated circuit units 41 through 43 to terminate their operation. Upon receipt of this communication signal, the integrated circuits 41 through 43 go into the standby state, as shown by the line 36.

When, along with the timer period T1 having been set, also the integrated circuit units 41 through 43 have been stopped by the procedure described above, then the control unit 6 stops the output of the activity maintenance signal, as shown by the line 34. Due to this, the supply of power to the control unit 6 from the main power supply circuit 71 of the power supply unit 7 is stopped, and, as shown by the line 35, the operation of the control unit 6 is stopped. As a result, at the time point t1, the operational mode of the assembled battery monitoring device 3 transitions from the normal mode to the low power consumption mode. During this low power consumption mode, in the power supply unit 7, while the supply of power from the main power supply circuit 71 is stopped, the supply of standby power from the standby power supply circuit 72 is not stopped. Due to this, the operation of the timer starting circuit 8 is continued, and, during the low power consumption mode, it is possible to determine whether or not the timer period that has been set has elapsed.

After operation according to the low power consumption mode has been started at the time point t1, when at the time point t2 the timer period T1 that has been set elapses, the timer starting circuit 8 outputs a timer activation signal. In response to the output of this timer activation signal the power supply unit 7 is reactivated, and the supply of power to the control unit 6 from the main power supply circuit 71 of the power supply unit 7 is resumed. As a result, as shown by the line 35, the control unit 6 goes into the active state for a second time, and operation of the assembled battery monitoring device 3 in its normal mode is started by timer starting.

Now the control unit 6 executes pre-processing for cell balancing. At this time, initially, the control unit 6 performs operation similar to that during normal starting described above. In other words, as shown by the line 34, it outputs an activity maintenance signal to the OR logic input circuit 10, and thus ensures that the operation of the control unit 6 can continue. Moreover, the control unit 6 transmits a predetermined communication signal to the integrated circuit units 41 through 43 via the communication interface 5 and the insulation element 91. Upon receipt of this communication signal, the integrated circuit units 41 through 43 go into the active state, as shown by the line 36.

When the integrated circuit units 41 through 43 have been started, the control unit 6 transmits a communication signal to the integrated circuit units 41 through 43 commanding them to measure the voltages of the cells 1, and then acquires the results of these measurements from the integrated circuit units 41 through 43. And the control unit 6 makes a decision upon the necessity of performing cell balancing on the basis of these results of measurement of the voltages of the cells 1 that have been acquired, and, if cell balancing is required, transmits to the integrated circuit units 41 through 43 a communication signal commanding them to execute cell balancing for the cells 1.

After having issued a command for the start of cell balancing to the integrated circuit units 41 through 43, the control unit 6 starts processing for activation termination. At this time, by outputting a timer setting signal to the timer starting circuit 8, as shown by the line 37, the control unit 6 sets a timer period according to the required time interval for cell balancing. In other words, among the previously described timer periods of two types, the control unit 6 sets the timer period T2 to the timer starting circuit 8. And then, as shown by the line 34, the output of the activity maintenance signal is stopped. Due to this, the supply of power to the control unit 6 from the main power supply circuit 71 of the power supply unit 7 is suspended, and, as shown by the line 35, the operation of the control unit 6 is suspended. As a result, at the time point t3, the operational mode of the assembled battery monitoring device 3 transitions from the normal mode to the low power consumption mode, while the cell balancing operation by the integrated circuit units 41 through 43 is still being continued.

When, after operation according to the low power consumption mode has been started at the time point t3, the timer period T2 that was set according to the required time period for cell balancing elapses at the time point t4, the timer starting circuit 8 outputs a tinier activation signal. In response to this timer activation signal, as previously described, the power supply unit 7 is reactivated, and supply of power to the control unit 6 from the main power supply circuit 71 of the power supply unit 7 is resumed. As a result, as shown by the line 35, the control unit 6 goes into the active state for a second time, and operation of the assembled battery monitoring device 3 in the normal mode is resumed by timer starting.

Now the control unit 6 proceeds to perform post-processing after the cell balancing. At this time, as shown by the line 34, the control unit 6 outputs an activity maintenance signal to the OR logic input circuit 10, and thus ensures that it is possible for the operation of the control unit 6 to be continued. Moreover, the control unit 6 transmits a communication signal to the integrated circuit units 41 through 43 commanding them to measure the voltages of the cells 1, and acquires the results of these measurements from the integrated circuit units 41 through 43. And, on the basis of these results of measurement of the voltages of the cells 1 that have been acquired, the control unit 6 makes a decision as to whether or not cell balancing has been completed. If the result is that cell balancing has been completed, then, via the communication interface 5 and the insulation element 91, the control unit 6 transmits to the integrated circuit units 41 through 43 a communication signal for commanding the integrated circuit units 41 through 43 to stop their operation. And, upon receipt of this communication signal, the integrated circuit units 41 through 43 go into the standby state, as shown by the line 36.

Subsequently, the control unit 6 starts processing for termination of activation. At this time, the control unit 6 outputs a timer setting signal to the timer starting circuit 8, and, as shown by the line 37, sets a timer period T1 that corresponds to the time interval until the next start timing. And, as shown by the line 34, the control unit 6 stops output of the activity maintenance signal. Due to this, the supply of power to the control unit 6 from the main power supply circuit 71 of the power supply unit 7 is suspended, and, as shown by the line 35, the operation of the control unit 6 is suspended. As a result, the operational mode of the assembled battery monitoring device 3 transitions from the normal mode to the low power consumption mode at the time point t5.

Subsequent to the time point t5, similar operations to those described above are repeated. In other words if, during waiting in the waiting to start state, a higher level activation signal is outputted from the higher level system 12, then the assembled battery monitoring device 3 performs operation according to normal starting, in a similar manner to the case of the interval between the time points t0 and t1. On the other hand if, during waiting in the waiting to start state, the timer period T1 that has been set elapses and a timer activation signal is outputted from the timer starting circuit 8, then the assembled battery monitoring device 3 performs operation according to timer starting in a similar manner to the case during the interval between the time points t2 and t5. In concrete terms, the system performs pre-processing and starts cell balancing, and then causes the integrated circuit units 41 through 43 to be operated in the low power consumption mode, and, after the cell balancing has been performed, performs post-processing and causes the operation of the integrated circuit units 41 through 43 to be suspended. And, by operating in the low power consumption mode until the next start timing, the system waits in the waiting to start mode.

Here, it is desirable for the higher level activation signal from the higher level system 12 and the timer activation system from the timer starting circuit 8 to be respectively outputted as signals having mutually different voltage levels. By doing this, after the control unit 6 has been stated by the supply of power from the main power supply circuit 71 of the power supply unit 7, it is possible for the control unit 6 to measure the voltage level of the input signal to the power supply unit 7, in other words to measure the voltage level of the activation signal from the OR logic input circuit 10, and to determine whether the input signal is a higher level activation signal or a timer activation signal on the basis of this voltage level. And, from the result of this determination, it is possible to select either normal starting or timer starting, and to perform operation according to the result of this selection. Or, alternatively, it would also be acceptable to arrange for the power supply unit 7 to measure the voltage level of the input signal, and to output the result of this measurement to the control unit 6.

Figure 4:
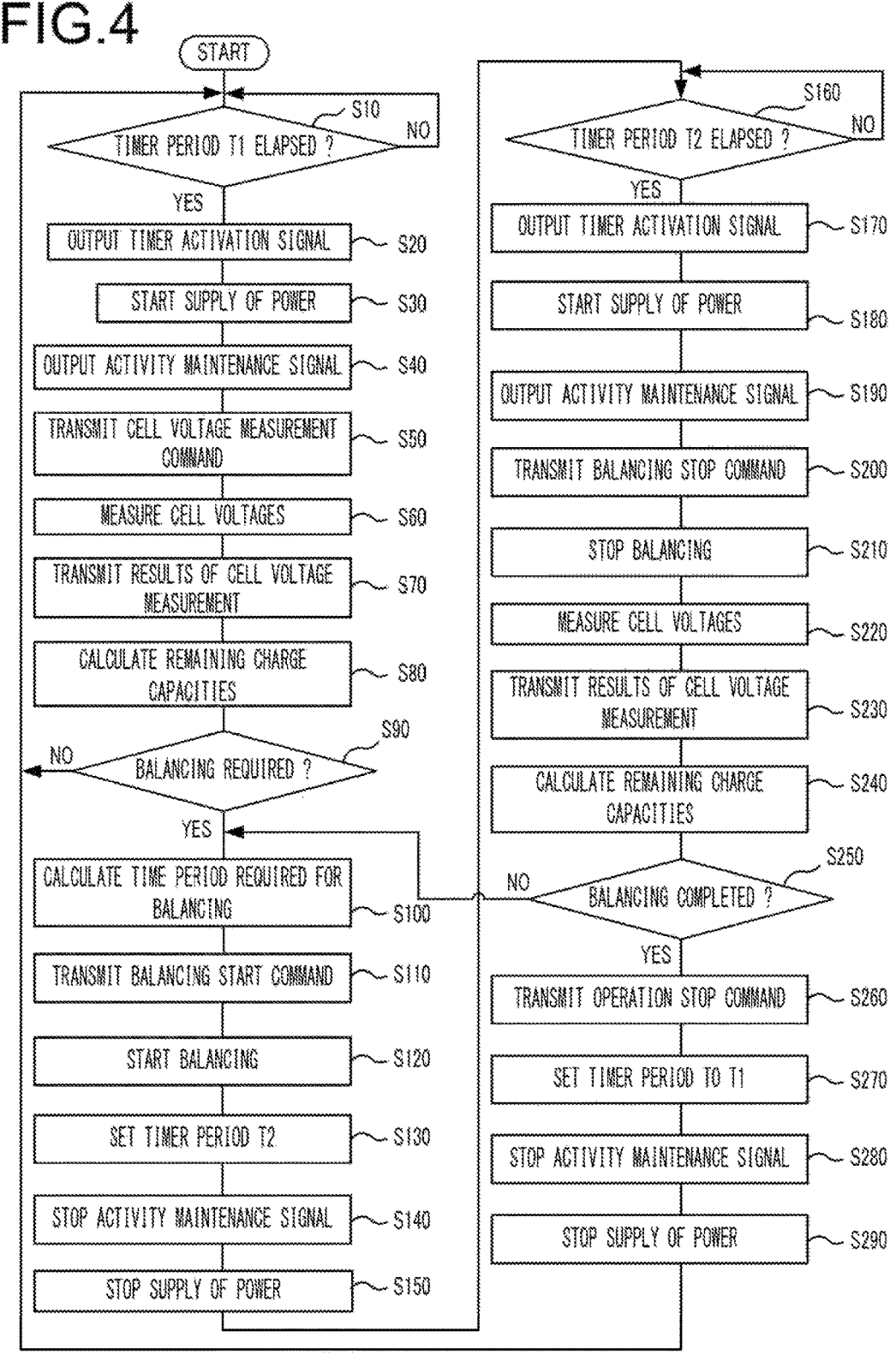
FIG. 4 is a flow chart showing a processing flow of this assembled battery monitoring device according to the first embodiment of the present invention during timer starting.

FIG. 4 is a flow chart showing the processing flow of this assembled battery monitoring device 3 according to the first embodiment of the present invention when the timer is started. In the following, the processing when the timer is started in this embodiment will be explained in detail according to this flow chart.

In a step S10, after having finally suspended the supply of power to the control unit 6 from the main power supply circuit 71 of the power supply unit 7, the timer starting circuit 8 makes a decision as to whether or not the timer period T1 that has been set in advance has elapsed. As has been described above, this timer period T1 is a period for periodically performing cell balancing, and is set in the timer starting circuit 8 according to control by the higher level system 12 during normal starting, or by the processing of a step S270 which will be explained hereinafter being executed by the control unit 6 during cell balancing during the previous cycle. The flow of control waits at this step S10 until the timer period T1 has elapsed, and proceeds to a step S20 when the period T1 has elapsed.

In this step S20, the timer starting circuit 8 outputs a timer activation signal to the OR logic input circuit 10. And, via the OR logic input circuit 10, this timer activation signal is inputted as an activation signal to the power supply unit 7. Due to this, the timer starting circuit 8 activates the power supply unit 7, and supply of power from the main power supply circuit 71 to the control unit 6 is commenced.

Then, in a step S30, the power supply unit 7 activates according to the timer activation signal that has been inputted as an activation signal in the step S20, and starts the supply of power to the control unit 6. In other words, supply of power to the control unit 6 from the main power supply circuit 71 is performed, while still continuing the supply of standby power from the standby power supply circuit 72 to the timer starting circuit 8. Due to this, operation of the control unit 6 is started.

Next in a step S40 the control unit 6 outputs an activity maintenance signal to the power supply unit 7. In a similar manner to the case with the timer activation signal that was outputted from the timer starting circuit 8 in the step S20, this activity maintenance signal is inputted via the OR logic input circuit 10 to the power supply unit 7 as an activation signal.

Then, in a step S50, the control unit 6 transmits a command for measurement of the voltages of the cells 1 of the assembled battery 2 to the integrated circuit units 41 through 43. In other words, a communication signal is transmitted from the control unit 6, taking the cells 1 of the cell groups GB1 through GB3 as subjects for measurement, and containing information commanding these voltages to be measured. This communication signal is transmitted to the integrated circuit unit 41 via the communication interface 5 and the insulation element 91. By doing this the integrated circuit units 41 through 43, which are daisy chain connected, are sequentially started, and the communication signal is received from the control unit 6.

Next, in a step S60, in response to the voltage measurement command transmitted from the control unit 6 in the step S50, the integrated circuit units 41 through 43 measure the voltages of the cells 1 of the corresponding cell groups.

Then, in a step S70, the integrated circuit units 41 through 43 transmit the results of measurement of the voltages of the cells 1 performed in the step S60 to the control unit 6. In other words, communication signals that include the results of measurement of the voltages of the cells 1 are transmitted in the order of the integrated circuit units 41 through 43 which are arranged in a daisy chain connection. These communication signals are transmitted to the control unit 6 from the integrated circuit unit 43 via the communication interface 5 and the insulation element 92, and are received by the control unit 6.

Next, in a step S80, the control unit 6 calculates the remaining charge capacities of the cells 1 on the basis of the results of measurement of the voltages of the cells 1 that were received in the step S70 from the integrated circuit units 41 through 43. For example, it would be possible for the control unit 6 to obtain the remaining charge capacities corresponding to the results of measurement of the voltages of the cells 1 by storing in advance tabular information specifying the relationship between the voltage values of the cells 1 and their remaining charge capacities, and by using this tabular information.

Then in a step S90, on the basis of the remaining charge capacities of the cells 1 that have been calculated in the step S80, the control unit 6 makes a decision as to whether or not cell balancing is required. For example, among the remaining charge capacities of the cells 1, the minimum remaining charge capacity may be taken as a reference value, and, if some cell 1 is present for which the difference between its remaining charge capacity and this reference value is greater than a predetermined control range, then it may be determined that cell balancing is required for that cell 1. Or it would also be acceptable to arrange to take the average of the remaining charge capacities of the cells 1 as the reference value. If the result is that it is determined that cell balancing is required for at least one of the cells 1, then the flow of control proceeds to a step S100. On the other hand, if it is determined that cell balancing is not required for any of the cells 1, then the flow of control returns to the step S10, and the system waits until the timer period T1 again elapses. Due to the processing of this step S90, the control unit 6 is able to determine whether or not cell balancing is necessary, on the basis of the results of measurement of the voltages of the cells 1 that were received in the step S70 from the integrated circuit units 41 through 43.

In the step S100, the control unit 6 calculates the time period required for cell balancing on the basis of the remaining charge capacities of the cells 1 that were calculated in the step S80. For example by using the remaining charge capacity of that cell 1, among the remaining charge capacities of the cells 1 for which the differences from the reference value described above are greater than a predetermined control range, for which the difference from the reference value is a minimum, the time period that will be required until this cell has been discharged to the reference value by cell balancing may be calculated. Due to the processing in this step S100, the control unit 6 is able to calculate the time periods required for cell balancing on the basis of the results of measurement of the voltages of the cells 1 that were received from the integrated circuit units 41 through 43 in the step S70.

Then, in a step S110, the control unit 6 transmits cell balancing start command to the integrated circuit units 41 through 43, taking as subjects the cells 1 for which it was decided in the step S90 that cell balancing is required. In other words, a communication signal including cell balancing start command information for those cells 1 is transmitted from the control unit 6 to the integrated circuit units corresponding to the cell group or groups to which those cells 1 belong. This communication signal is transmitted to the integrated circuit unit 41 via the communication interface 5 and the insulation element 91, and is received by the integrated circuit units 41 through 43 in the order in which they are connected by daisy chain connection.

Next, in a step S120, according to the cell balancing start command that was transmitted from the control unit 6 in the step S110, the integrated circuit units 41 through 43 start cell balancing for the cells 1 that have been designated in their corresponding cell groups.

In a step S130, the control unit 6 outputs a timer setting signal to the timer starting circuit 8, and thereby sets the timer period T2. At this time, the value of the timer period T2 that is to be set is determined on the basis of the result of calculation of the time period required for cell balancing in the step S100. By doing this, it is possible to set the timer period T2 to the timer starting circuit 8 so as to be matched to the timing at which cell balancing is to be stopped.

In the next step S140, by stopping the output of the activity maintenance signal that was started in the step S40, the control unit 6 suspends the activation signal from the OR logic input circuit 10 to the power supply unit 7, and thereby causes the power supply unit 7 to transition to its standby state. Due to this, the control unit 6 causes the power supply unit 7 to stop the supply of power from the main power supply circuit 71.

Then in a step S150 the power supply unit 7 transitions to its standby state due to stopping of the activation signal in the step S140, so that supply of power to the control unit 6 is stopped. In other words, the supply of power from the main power supply circuit 71 to the control unit 6 is stopped, while still continuing the supply of standby power from the standby power supply circuit 72 to the timer starting circuit 8. Due to this, during the state in which cell balancing is being executed by the integrated circuit units 41 through 43, the operation of the control unit 6 is suspended, so that operation of the assembled battery monitoring device 3 in the low power consumption mode is started.

In the next step S160, the timer starting circuit 8 makes a decision as to whether or not the timer period T2 that was set in the step S130 has elapsed from the time point at which the supply of power to the control unit 6 from the main power supply circuit 71 of the power supply unit 7 was stopped in the step S150. The flow of control waits at the step S160 until the timer period T2 has elapsed, and then proceeds to a step S170 when that period T2 has elapsed.

In steps S170 through S190, the timer starting circuit 8, the power supply unit 7, and the control unit 6 perform similar processing to that of the previously described steps S20 through S40. In other words, in the step S170, the timer starting circuit 8 outputs a timer activation signal and activates the power supply unit 7 so that the supply of power is commenced. And, due to the power supply unit 7 starting in the step S180 in response to this timer activation signal, the control unit 6 outputs an activity maintenance signal to the power supply unit 7 in the step S190.

Then in a step S200 the control unit 6 transmits a command for termination of cell balancing to the integrated circuits 41 through 43, taking as subjects the cells 1 for which the cell balancing start command was transmitted in the step S110. In other words, a communication signal is transmitted from the control unit 6 to the integrated circuit units corresponding to the cell groups to which those cells 1 belong, including stop command information for stopping the cell balancing of those cells 1. This communication signal is transmitted to the integrated circuit unit 41 via the communication interface 5 and the insulation element 91, and is received by the integrated circuit units 41 through 43 in the order in which they are connected by daisy chain connection.

Next, in a step S210, in response to the command for stopping of cell balancing transmitted from the control unit 6 in the step S200, the integrated circuit units 41 through 43 stop cell balancing for the cells 1 that were designated in the corresponding cell groups.

And then in a step S220 the integrated circuit units 41 through 43 measure the voltages of the cells 1 in the respectively corresponding cell groups.

In a step S230, in a similar manner to the case in the step S70, the integrated circuit units 41 through 43 transmit the results of the measurement of the voltages of the cells 1 performed in the step S220 to the control unit 6.

Then, in a step S240, on the basis of the results of measurement of the voltages of the cells 1 that were received from the integrated circuit units 41 through 43 in the step S230, the control unit 6 calculates the remaining charge capacities of the cells 1 after cell balancing, by a similar technique to that employed in the step S80.

Next, in a step S250, on the basis of the remaining charge capacities of the cells 1 after cell balancing that were calculated in the step S240, the control unit 6 determines whether or not cell balancing has been completed. This decision may be performed by a similar technique to that employed in the step S90. In other words, among the remaining charge capacities of the cells 1, either the minimum remaining charge capacity or the average of the remaining charge capacities of the cells 1 is taken as a reference value, and a decision is made as to whether or not some cell 1 is present for which the difference between its remaining charge capacity and this reference value is greater than a predetermined control range. If the result is that at least one of the cells 1 satisfies this type of condition, then it is decided that the cell balancing has not been completed, and the flow of control returns to the step S100 so that the cell balancing described above is executed for a second time. But if not even one of the cells 1 satisfies the above condition, then it is decided that the cell balancing has been completed, and the flow of control proceeds to a step S260.

In this step S260, the control unit 6 transmits an operation stop command to the integrated circuit units 41 through 43. In other words, a communication signal is transmitted from the control unit 6 that includes command information for stopping the operation of the integrated circuit units 41 through 43. This communication signal is transmitted to the integrated circuit units 41 through 43 via the communication interface 5 and the insulation element 91. And, in response to this operation stop command, the operation of the integrated circuit units 41 through 43, which are connected together by daisy chain connection, is stopped.

Then in the next step S270 the control unit 6 outputs a timer setting signal to the timer starting circuit 8, and thereby sets the timer period T1. It is desirable for this set value for the timer period T1 to be set in advance by the control unit 6 or the timer starting circuit 8 according to the intervals at which cell balancing performed in the low power consumption mode is to be executed.

Next in a step S280, in a similar manner to the case in the step S140, by stopping the output of the activity maintenance signal that was started in the step S190, the control unit 6 stops the activation signal from the OR logic input circuit 10 to the power supply unit 7, so that the power supply unit 7 is caused to transition to the standby state. Due to this, the control unit 6 causes the power supply unit 7 to stop the supply of power from the main power supply circuit 71.

And then, in a step S290, in a similar manner to the case in the step S150, the power supply unit 7 transitions to the standby state in response to the stopping of the activation signal in the step S280, so that the supply of power to the control unit 6 is stopped. Due to this, after the cell balancing has been completed, the operation of the control unit 6 is suspended, and the operation of the assembled battery monitoring device 3 is started in the low power consumption mode. When this step S290 has been executed, the flow of control returns to the step S10, and the system waits until the next timer period T1 elapses.

According to the first embodiment of the present invention as explained above, the following beneficial operational effects are obtained.

(1) The assembled battery monitoring device 3 is a device for monitoring the assembled battery 2 that incorporates the cell groups GB1 through GB3 in each of which a plurality of cells 1 are connected in series, and incorporates the integrated circuit units 41 through 43, the control unit 6 that performs communication with the integrated circuit units 41 through 43 and controls them, and the power supply unit 7 that supplies power to the control unit 6. The integrated circuit units 41 through 43 are provided so as to correspond to the cell groups GB1 through GB3 of the assembled battery 2, and, along with measuring the voltages of the cells 1 of those cell groups, also perform cell balancing in order to adjust the capacities of the cells 1 of the cell groups. And, according to supply of power from the power supply unit 7, along with causing the integrated circuit units 41 through 43 to start cell balancing (the step S120) or to stop cell balancing (the step S210), the control unit 6 also sets the timer periods for starting the power supply unit 7 (the steps S130 and S270), and causes the power supply unit 7 to stop the supply of power (the steps S140 and S280). Moreover, according to the timer period set in the step S130 or the step S270, the power supply unit 7 activates and starts the supply of power to the control unit 6 (the steps S30 and S180). Since it is arranged to do all the above, accordingly, along with the operation of the control unit 6 being suspended during cell balancing and the assembled battery monitoring device 3 being enabled to operate in the low power consumption mode, also it is possible to resume the operation of the control unit 6 at an appropriate timing. As a result, along with attaining the objective of reduction of the consumption of power during cell balancing at low cost, also it is possible to check that cell balancing has been completed.

(2) The control unit 6 transmits to the integrated circuit units 41 through 43 commands for measurement of the voltages of the cells 1 of the corresponding cell groups (the step S50). And, in response to these commands from the control unit 6, the integrated circuit units 41 through 43 measure the voltages of the cells 1 of the corresponding cell groups (the step S60), and transmit the results of these measurements to the control unit 6 (the step S70). And, on the basis of these results of measurement of the voltages of the cells 1 that have been received from the integrated circuit units 41 through 43, the control unit 6 determines whether or not cell balancing is required (the step S90), and if it has been decided that cell balancing is required, causes the integrated circuit units 41 through 43 to start cell balancing in the step S120. Since it is arranged to do this, accordingly it is possible to determine whether or not cell balancing is required in an accurate manner, and to start cell balancing reliably if it is necessary.

(3) The power supply unit 7 is connected to the timer starting circuit 8, which is capable of setting the timer period T1 and the timer period T2. And, after the supply of power by the power supply unit 7 to the control unit 6 is suspended, when the timer period T1 has elapsed (the step S10) or the timer period T2 has elapsed (the step S160), the timer starting circuit 8 causes the power supply unit 7 to be activated (the steps S20 and S170) and to start supply of power. If the power supply unit 7 has been started due to the timer period T1 elapsing, then, along with causing the integrated circuit units 41 through 43 to start cell balancing in the step S120, also the control unit 6 sets the timer period T2 to the timer starting circuit 8 (the step S130). On the other hand, if the power supply unit 7 has been started due to the timer period T2 elapsing, then, along with causing the integrated circuit units 41 through 43 to stop the cell balancing in the step S210, also the control unit 6 sets the timer period T1 to the timer starting circuit 8 (the step S270). Since it is arranged to do this, accordingly, along with cell balancing being performed periodically by this assembled battery monitoring device 3, also cell balancing can be stopped at an appropriate timing.

(4) On the basis of the results of measurement of the voltages of the cells 1 that have been received from the integrated circuit units 41 through 43, the control unit 6 calculates the time period required for cell balancing (the step S100), and sets the timer period T2 in the step S130 on the basis of the result of this calculation. Since it is arranged to do this, accordingly it is possible to set the tinier period T2 to a value that is appropriately matched to the timing at which cell balancing should be stopped.

(5) The assembled battery monitoring device 3 also includes the timer starting circuit 8. And the power supply unit 7 includes the main power supply circuit 71 for supplying power to the control unit 6 and the standby power supply circuit 72 for always supplying standby power to the timer starting circuit 8. Since these arrangements are provided, accordingly, when this assembled battery monitoring device 3 is operating in the low power consumption mode, it is possible to supply from the power supply unit 7 only the standby power supply that is needed for the operation of the timer starting circuit 8.

(6) The power supply unit 7 is connected to the higher level system 12 that controls the assembled battery monitoring device 3, and, in response to a higher level activation signal outputted from this higher level system 12, performs starting (normal starting) and starts the supply of power to the control unit 6. And, if the power supply unit 7 has been activated in response to the higher level activation signal from the higher level system 12, then, when the output of the higher level activation signal from the higher level system 12 is stopped, after having performed processing for activation termination, the control unit 6 stops the output of the activity maintenance signal to cause the power supply unit 7 to stop the supply of power. Since these arrangements are provided, accordingly it is possible for the operation of this assembled battery monitoring device 3 to be started and terminated at any desired timing by the higher level system 12.

(7) It would be acceptable to arrange for the timer starting circuit 8 to activate the power supply unit 7 by outputting a timer activation signal to the power supply unit 7 at a voltage level that is different from that of the higher level activation signal from the higher level system 12. In this case, on the basis of the voltage level of the input signal to the power supply unit 7, the control unit 6 would be able to determine whether this input signal is a higher level activation signal or is a timer activation signal. By doing this, it would be possible to make the assembled battery monitoring device 3 perform respectively appropriate operation for the case of normal starting, in other words for the case in which starting is being performed by the higher level system 12, and also for the case of timer starting, in other words for the case in which starting is performed by the timer starting circuit 8.

Embodiment #2

Next, a second embodiment of the present invention will be explained. In the first embodiment described above, an example was explained in which cell balancing was performed simultaneously for all of the cells 1 for which cell balancing was required. By contrast, in the second embodiment described below, an example will be explained in which cell balancing is performed at separate timings for each pair of mutually adjacent cells 1. It should be understood that the structure of the assembled battery monitoring device according to this embodiment is the same as that shown in FIG. 1. Accordingly, in the following explanation, the operation of the assembled battery monitoring device according to this embodiment will be explained by using the structure of the assembled battery monitoring device 3 shown in FIG. 1.

Figure 5:
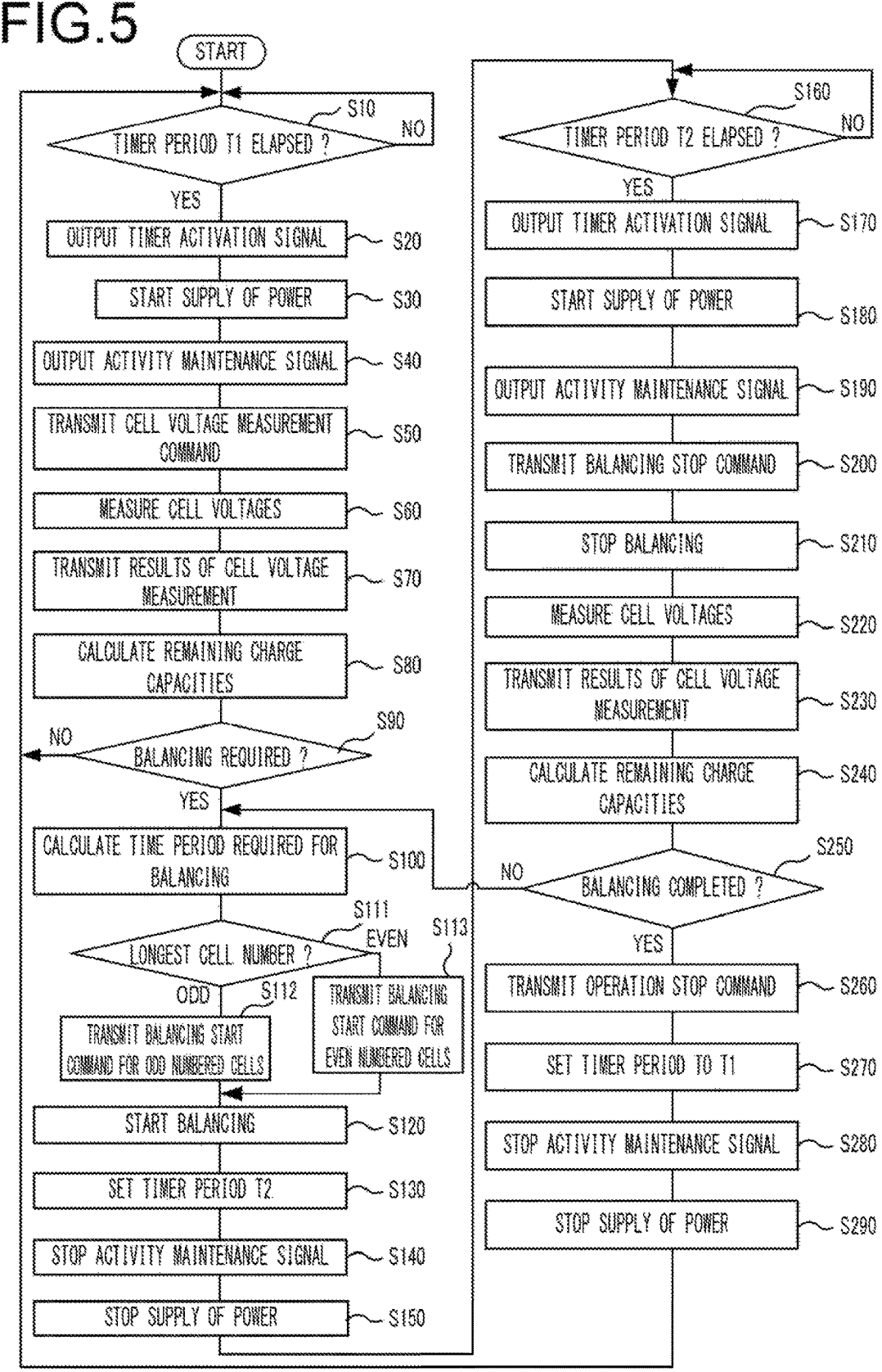
FIG. 5 is a flow chart showing a processing flow of an assembled battery monitoring device according to a second embodiment of the present invention during timer starting.

FIG. 5 is a flow chart showing the processing flow of this assembled battery monitoring device 3 according to the second embodiment of the present invention during timer starting. In the following, the details of the processing by this embodiment during timer starting will be explained with reference to this flow chart. It should be understood that, in the flow chart of FIG. 5, the same step numbers are appended to processing steps whose details are the same as in the processing of the first embodiment shown in FIG. 4. Moreover, in the following explanation, unless particularly required, explanation will be omitted for these processing steps having the same step numbers.

In a step S111, among those cells for which it has been determined in the step S90 that cell balancing is required, the control unit 6 specifies that cell 1 for which the time period required for cell balancing as calculated in the step S100 is the longest. And a determination is made as to whether the cell number allocated to that cell 1 is an odd number or is an even number. If the cell number for that cell 1 is odd, in other words if that cell 1 is a cell BC1 or BC3 of FIG. 2, then the flow of control proceeds to a step S112. On the other hand, if the cell number for that cell 1 is even, in other words if that cell 1 is a cell BC2 or BC4 of FIG. 2, then the flow of control is transferred to a step S113.

In the step S112, the control unit 6 transmits cell balancing start commands to the integrated circuit units 41 through 43 that take as their subject, among those of the cells 1 for which it was determined in the step S90 that cell balancing is required, those cells for which the cell numbers are odd. In other words, to the integrated circuit units corresponding to those cell groups to which those odd numbered cells 1 belong, communication signals are transmitted from the control unit 6 that include cell balancing start command information for those cells 1. These communication signals are transmitted to the integrated circuit unit 41 via the communication interface 5 and the insulation element 91, and are received in the order in which the integrated circuit units 41 through 43 are connected by daisy chain connection.

On the other hand, in the step S113, the control unit 6 transmits cell balancing start commands to the integrated circuit units 41 through 43 that take as their subject, among those of the cells 1 for which it was determined in the step S90 that cell balancing is required, those cells for which the cell numbers are even. In other words, to the integrated circuit units corresponding to those cell groups to which those even numbered cells 1 belong, communication signals are transmitted from the control unit 6 that include cell balancing start command information for those cells 1. These communication signals are transmitted to the integrated circuit unit 41 via the communication interface 5 and the insulation element 91, and are received in the order in which the integrated circuit units 41 through 43 are connected by daisy chain connection.

After the step S112 or the step S113 has been executed, in the step S120 and subsequently, similar processing is performed to that of the flow chart of FIG. 4 explained in connection with the first embodiment.

According to the second embodiment of the present invention as explained above, it is possible to obtain similar beneficial operational effects to those explained in connection with the first embodiment. Furthermore, it is possible to perform cell balancing for cells that are mutually adjacent at separate timings. Accordingly, it is possible to prevent excessively great currents flowing in the integrated circuit units 41 through 43 due to cell balancing being performed at the same time for a large number of the cells 1 that are connected in series, which would be undesirable.

Embodiment #3

Next, a third embodiment of the present invention will be explained. In the first embodiment explained above, an example of an assembled battery monitoring device 3 was explained in which the timer starting circuit 8 was provided internally. By contrast, in the third embodiment which is explained in the following disclosure, an example of an assembled battery monitoring device 3 will be explained in which the timer starting circuit 8 is provided externally.

Figure 6:
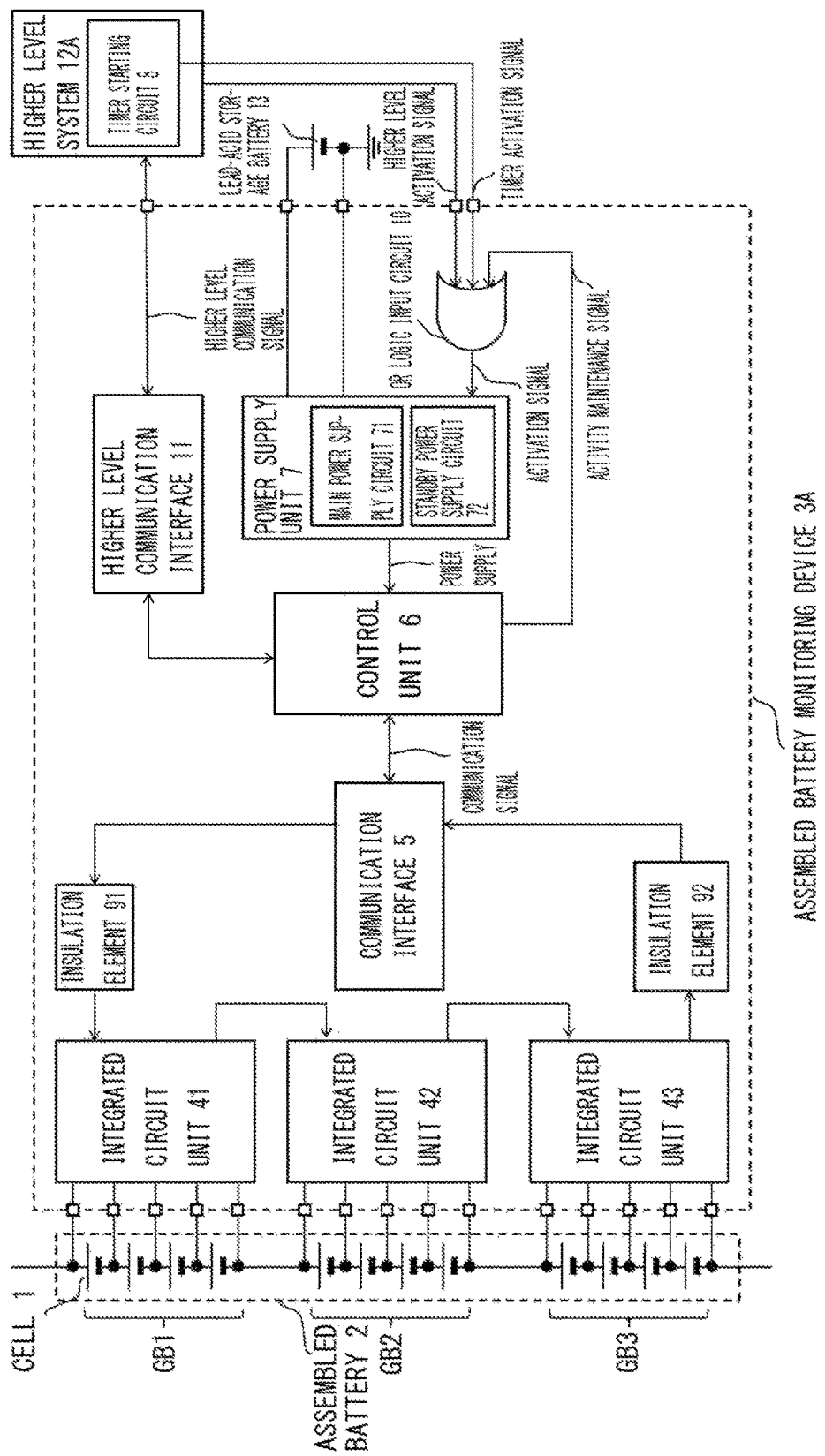
FIG. 6 is a figure showing the structure of an assembled battery monitoring device according to a third embodiment of the present invention.

FIG. 6 is a figure showing the structure of an assembled battery monitoring device according to a third embodiment of the present invention. As compared to the assembled battery monitoring device 3 of FIG. 1 explained above in connection with the first embodiment, the assembled battery monitoring device 3A shown in FIG. 6 differs by the feature that the timer starting circuit 8 is not provided within its interior. This assembled battery monitoring device 3A is connected to a higher level system 12A that incorporates the timer starting circuit 8.

In addition to the higher level activation signal explained in connection with the first embodiment, this higher level system 12A also outputs a timer activation signal from the internal timer starting circuit 8 to the assembled battery monitoring device 3A. In a similar manner to the case explained in connection with the first embodiment, these signals are both inputted to the OR logic input circuit 10, and are outputted to the power supply unit 7 as activation signals.

By transmitting and receiving higher level communication signals to and from the higher level system 12A via the higher level communication interface 11, the control unit 6 is able to perform setting of the timer periods to the timer starting circuit 8. When a higher level communication signal that includes setting information for a timer period is transmitted from the control unit 6, the higher level system 12A sets this timer period to its internal timer starting circuit 8. In this manner, according to the timer period that has been set, in a similar manner to that explained in connection with the first embodiment, a timer activation signal is outputted from the timer starting circuit 8, and is inputted to the power supply unit 7 via the OR logic input circuit 10. Due to this, the power supply unit 7 is activated and the supply of power to the control unit 6 is started, and the operational mode of the assembled battery monitoring device 3A transitions from the low power consumption mode to the normal mode.

It should be understood that the processing according to this embodiment by the assembled battery monitoring device 3A during timer transition may be performed according to either of the flow charts of FIGS. 4 and 5 that have been explained in connection with the first and the second embodiment respectively.

According to the third embodiment of the present invention as explained above, it is possible to obtain similar beneficial operational effects to those obtained with the first and the second embodiments. Moreover, since it is arranged to provide the timer starting circuit 8 exterior to the assembled battery monitoring device 3A, accordingly, along with it being possible to reduce the amount of electrical power consumed by the assembled battery monitoring device 3A by yet a further level, also it is possible to anticipate a reduction in cost and in the space that is occupied.

It should be understood that while, in the third embodiment described above, it was arranged for the timer starting circuit 8 to be provided in the interior of the higher level system 12A, it would also be possible to provide it in some other location. For example, it would also be acceptable to arrange to implement the essential characteristics of the present invention by providing the timer starting circuit 8 as an externally attached circuit for extending the functionality of the assembled battery monitoring device 3A, and by utilizing this timer starting circuit by connecting it to the assembled battery monitoring device 3A.

In the above description of the first through the third embodiments, examples were explained in which the assembled battery monitoring device 3 or 3A monitored the assembled battery 2 including three cell groups GB1 through GB3 in each of which four cells 1 were connected in series. However, the structure of the assembled battery that is to be the subject of monitoring by the assembled battery monitoring device of the present invention is not to be considered as being limited to this structure. The present invention may be applied to an assembled battery monitoring device that monitors an assembled battery of any desired structure, provided that this assembled battery includes one or a plurality of cell groups in each of which a plurality of cells are connected in series.

The various embodiments and variant embodiments explained above have only been examples; the present invention is not to be considered as being limited by the details thereof, provided that its defining characteristics are preserved.

The invention claimed is:

1. An assembled battery monitoring device that monitors an assembled battery having one or a plurality of cell groups in which a plurality of cells are connected in series, comprising:
    one or more integrated circuit units, each of which is provided to correspond to each of the one or more cell groups of the assembled battery, that respectively measure the voltages of the cells of the corresponding cell group and perform cell balancing in order respectively to adjust the capacities of the cells of the corresponding cell group;
    a control unit that controls the integrated circuit unit by performing communication with the integrated circuit unit; and
    a power supply unit that supplies power to the control unit, wherein:
    according to supply of the power from the power supply unit, the control unit causes the integrated circuit unit to start or to stop the cell balancing, and sets a timer period for starting of the power supply unit to cause the power supply unit to stop supply of the power; and
    according to the timer period, the power supply unit activates and commences supply of the power, and
    wherein:
    the control unit transmits a command to the integrated circuit unit for measurement of the voltages of the cells of the corresponding cell group,
    in response to the command from the control unit, the integrated circuit unit measures the voltages of the cells of the corresponding cell group, and transmits the results of those measurements to the control unit, and
    the control unit determines whether or not the cell balancing is required on the basis of the results of measurement of the voltages of the cells received from the integrated circuit unit, and causes the integrated circuit unit to start the cell balancing if the decision is that the cell balancing is required, and
    wherein:
    the power supply unit is connected to a timer starting circuit that is capable of setting a first timer period and a second timer period,
    after having stopped supply of the power by the power supply unit, when the first timer period or the second timer period has elapsed, the timer starting circuit activates the power supply unit and thereby causes it to start supply of the power, and
    the control unit:
        if the first timer period elapses and the power supply unit is activated, causes the integrated circuit unit to start the cell balancing, and sets the second timer period to the timer starting circuit, and
        if the second timer period elapses and the power supply unit is activated, causes the integrated circuit unit to stop the cell balancing, and sets the first timer period to the timer starting circuit.

2. The assembled battery monitoring device according to claim 1, wherein the control unit calculates a required time period for the cell balancing on the basis of the results of measurement of the voltages of the cells received from the integrated circuit unit, and sets the second timer period on the basis of the result of that calculation.

3. The assembled battery monitoring device according to claim 1, further comprising the timer starting circuit.

4. The assembled battery monitoring device according to claim 3, wherein the power supply unit comprises a main power supply circuit for supplying the power to the control unit, and a standby power supply circuit for always supplying standby power to the timer starting circuit.

5. The assembled battery monitoring device according to claim 1, wherein:
    the power supply unit is connected to a higher level system that controls the assembled battery monitoring device;
    the power supply unit activates and starts supply of the power in response to a higher level activation signal outputted from the higher level system; and
    if the power supply unit has been activated according to the higher level activation signal, the control unit causes the power supply unit to stop supply of the power when the output of the higher level activation signal from the higher level system is stopped.

6. The assembled battery monitoring device according to claim 5, wherein:
    the timer starting circuit causes the power supply unit to activate by outputting to the power supply unit a timer activation signal whose voltage level is different from that of the higher level activation signal; and
    on the basis of the voltage level of an input signal to the power supply unit, the control unit determines whether the input signal is the higher level activation signal or is the timer activation signal.

7. The assembled battery monitoring device according to claim 5, wherein the timer starting circuit is provided within the higher level system.

* * * * *